(12) United States Patent
Kasuga et al.

(10) Patent No.: US 6,649,303 B2
(45) Date of Patent: *Nov. 18, 2003

(54) ALKALINE STORAGE BATTERY WITH GROUP OF SPIRAL ELECTRODES

(75) Inventors: Hideo Kasuga, Naruto (JP); Tadashi Ise, Itano-gun (JP); Nobuyasu Ishimaru, Tokushima (JP)

(73) Assignee: Sanyo Electric Co., Ltd., Osaka-Fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/526,911

(22) Filed: Mar. 16, 2000

(65) Prior Publication Data

US 2003/0152824 A1 Aug. 14, 2003

(30) Foreign Application Priority Data

Mar. 16, 1999 (JP) .............................................. 11-70518

(51) Int. Cl.[7] ...................... H01M 10/24; H01M 10/28; H01M 2/26
(52) U.S. Cl. ......................... 429/94; 429/206; 429/211; 429/218.2
(58) Field of Search ........................... 429/94, 211, 206, 429/218.2

(56) References Cited

U.S. PATENT DOCUMENTS

| | | | |
|---|---|---|---|
| 3,904,433 A | | 9/1975 | Frazier |
| 4,332,867 A | * | 6/1982 | Tsuda et al. .................. 429/94 |
| 5,006,426 A | | 4/1991 | Suzuki et al. |
| 5,064,735 A | * | 11/1991 | Rampel et al. ............. 429/206 |
| 5,238,757 A | * | 8/1993 | Suzuki et al. ................. 429/94 |
| 6,268,083 B1 | * | 7/2001 | Iida et al. ................ 429/218.2 |

* cited by examiner

*Primary Examiner*—John S. Maples
(74) *Attorney, Agent, or Firm*—Nixon & Vanderhye PC

(57) ABSTRACT

An alkaline storage battery including a group of spiral electrodes composed of positive and negative electrode plates spirally wound with a separator interposed therebetween and contained in a metallic cell casing used as an external terminal, wherein the group of spiral electrodes is formed at its central portion with a space defined by a winding core during the winding process of the electrode plates and is provided with a first current-collector welded to an upper end of one of the electrode plates and a second current-collector welded to a lower end of the other electrode plate, wherein the second current-collector is welded to an internal surface of the bottom of the cell casing without being welded to an end portion of the other plate located at the outermost periphery of the group of spiral electrodes, and wherein the other electrode plate at the outermost periphery of the group of spiral electrodes is pressed into contact with an internal peripheral wall of the cell casing.

3 Claims, 3 Drawing Sheets

ALKALINE STORAGE BATTERY WITH GROUP OF SPIRAL ELECTRODES

BACKGROUND OF THE INVENTION

1. Field of the Invention

The present invention relates to an alkaline storage battery such as a nickel-hydrogen storage battery, a nickel-cadmium storage battery and the like provided with a group of spiral electrodes composed of positive and negative electrode plates spirally wound with a separator interposed therebetween. More particularly, the present invention is concerned with a conductive connection between a group of spiral electrodes and a current-collector and a conductive connection between the group of spiral electrodes and a metallic cell casing.

2. Description of the Prior Art

In a manufacturing process of an alkaline storage battery such as a nickel-hydrogen storage battery or a nickel-cadmium storage battery, a group of spiral electrodes is composed of positive and negative electrode plates spirally wound with a separator interposed therebetween, and a positive current-collector is welded to the upper end of the positive electrode plate while a negative current-collector is welded to the bottom of the negative electrode plate. Thereafter, the negative current-collector is electrically connected to a negative terminal in the form of a metallic cell casing, while the positive current-collector is electrically connected to a positive terminal in the form of a closure element. In the case that the positive current-collector of the group of spiral electrodes is welded to the closure element while the negative current-collector is electrically connected to the bottom of the metallic cell casing, current distribution between the positive electrode plate and positive terminal (or closure element) and between the negative electrode plate and negative terminal (or cell casing) is uniformed to enhance a high-rate discharging characteristic of the storage battery.

In the alkaline storage battery, with the negative terminal is in the form of the metallic cell casing, an internal short-circuit will occur if the positive current-collector is brought into contact with the cell casing. It is, therefore, required to determine the size of the positive current-collector in an extent where the positive current-collector does not contact with the cell casing. On the other hand, any internal short-circuit does occur even if the negative current-collector is brought into contact with the cell casing. However, in the case that the outer diameter of the negative current-collector is determined substantially equal to the inner diameter of the cell casing, it becomes difficult to insert the group of spiral electrodes into the cell casing. If the negative current-collector was not welded to the group of spiral electrodes in an accurate position, the group of spiral electrodes would not be couple within the cell casing. For this reason, it is required to determine the size of the negative current-collector in an extent where the negative current-collector does not contact with the cell casing.

In the case that the size of the negative current-collector is determined to avoid contact with the cell casing, there will occur a non-welded portion of the negative current-collector in a position to be welded to the negative electrode plate. If such a non-welded portion is caused on the negative current-collector, the current distribution on a current collecting path between the negative current-collector and negative electrode plate becomes uneven resulting in drop of the battery voltage at the non-welded portion. The voltage drop does not cause any problem when the battery is charged and discharged at a small current. However, when the battery is charged and discharged at a large current of scores of amperes to hundreds of amperes, the battery voltage greatly drops due to a resistance at the non-welded portion, resulting in drop of the operation voltage. This causes deterioration of the high-rate discharging characteristic of the storage battery. As the reaction heat of the nickel-hydrogen storage battery at charging is smaller than that of a nickel-cadmium storage battery, the temperature rise of the battery becomes large due to the influence of joule-heat, resulting in an increase of the internal pressure of the battery at charging.

SUMMARY OF THE INVENTION

It is, therefore, a primary object of the present invention to provide an alkaline storage battery capable of enhancing the current collecting property of the negative current-collector even if a non-welded portion is caused on the current-collector to be welded or connected to the bottom of the cell casing. In the case that the present invention is adapted to a nickel-hydrogen storage battery, joule heat of the battery can be lowered by enhancement of the current collecting property of the negative current-collector. This is effective to suppress a temperature rise in the battery during charging and uniform reaction in the battery, thereby suppressing a rise in internal battery pressure.

According to the present invention, the object is accomplished by providing an alkaline storage battery including a group of spiral electrodes composed of positive and negative electrode plates spirally wound with a separator interposed therebetween and contained in a bottomed metallic cell casing used as an external terminal, wherein the group of spiral electrodes is formed at its central portion with a space defined by a winding core during the winding process of the electrode plates and is provided with a first current-collector welded to an upper end of one of the electrode plates (for example, the positive electrode plate) and a second current-collector welded to a lower end of the other electrode plate (for example, the negative electrode plate), wherein the second current-collector is welded to an internal surface of the bottom of the cell casing without being welded to an end portion of the other plate located at the outermost periphery of the group of spiral electrodes, and wherein the other electrode plate (for example, the negative electrode plate) at the outermost periphery of the group of spiral electrodes is pressed into contact with an internal peripheral wall of the cell casing.

In the alkaline storage battery described above, current collection at the electrode plate (for example, the negative electrode plate) pressed into contact with the internal peripheral wall is uniformed to reduce the voltage drop of the battery thereby to enhance a high-rate discharge characteristic of this kind of alkaline storage battery. Additionally, in the case that the core plate of the electrode plate (for example, the negative electrode plate) is pressed into contact with the internal peripheral wall of the cell casing, resistance at a surface in contact with the cell casing is further decreased to reduce the voltage drop of the battery thereby to further enhance the high-rate discharge characteristic of this kind of alkaline storage battery.

According to an aspect of the present invention, there is provided an alkaline storage battery including a group of spiral electrodes composed of positive and negative electrode plates spirally wound with a separator interposed therebetween and contained in a bottomed metallic cell casing used as an external terminal, wherein the group of spiral electrodes is formed without any space at its central portion and is provided with a first current-collector welded to an upper end of one of the electrode plates (for example, the positive electrode plate) and a second current-collector welded to a lower end of the other electrode plate (for example, the negative electrode plate), wherein the second current-collector is retained in contact with an internal surface of the bottom of the cell casing without being welded thereto and to an end portion of the other plate located at the outermost periphery of the group of spiral electrodes, and wherein the other electrode plate (for example, the negative electrode plate) at the outermost periphery of the group of spiral electrodes is pressed into contact with an internal peripheral wall of the cell casing.

With such an arrangement of the alkaline storage battery described above, the capacity of the battery can be increased, and the resistance at a surface of the electrode plate (for example, the negative electrode plate) in contact with the cell casing is decreased to reduce the voltage drop of the battery thereby to enhance the high-rate discharge characteristic of this kind of alkaline storage battery.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
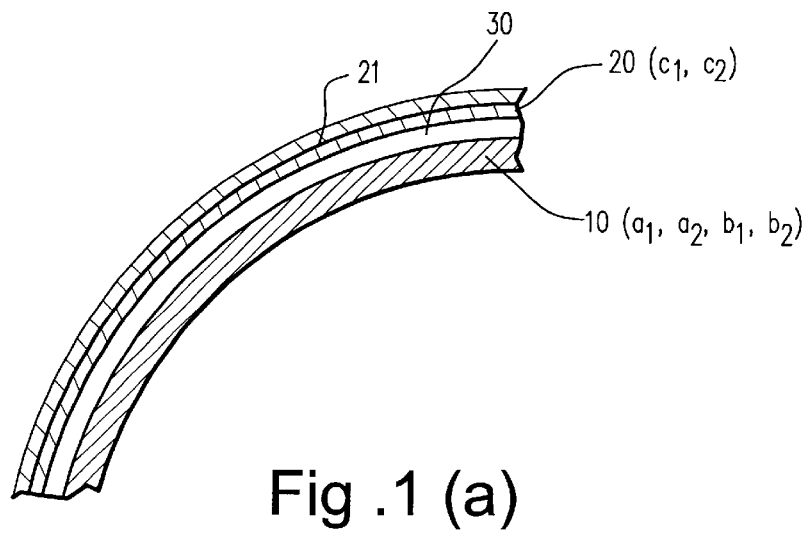
FIGS. 1(a) to 1(c) each are a sectional view illustrating an outermost periphery of each group of spiral electrodes.
Figure 1:
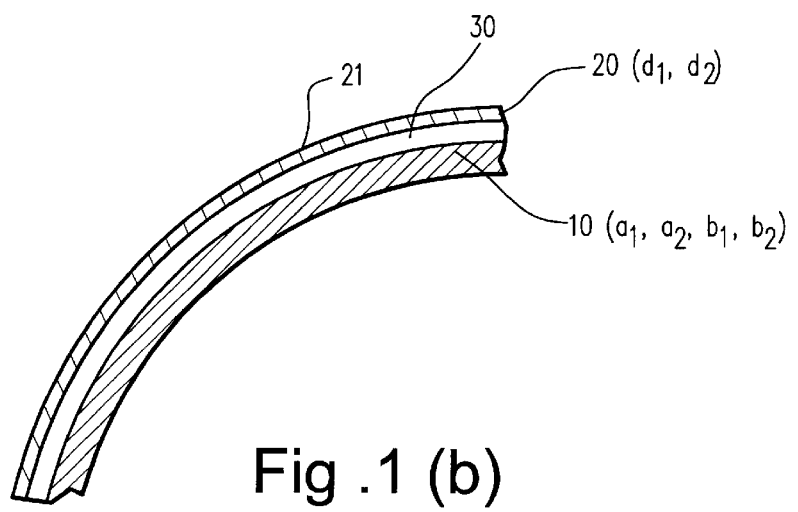
Figure 1:
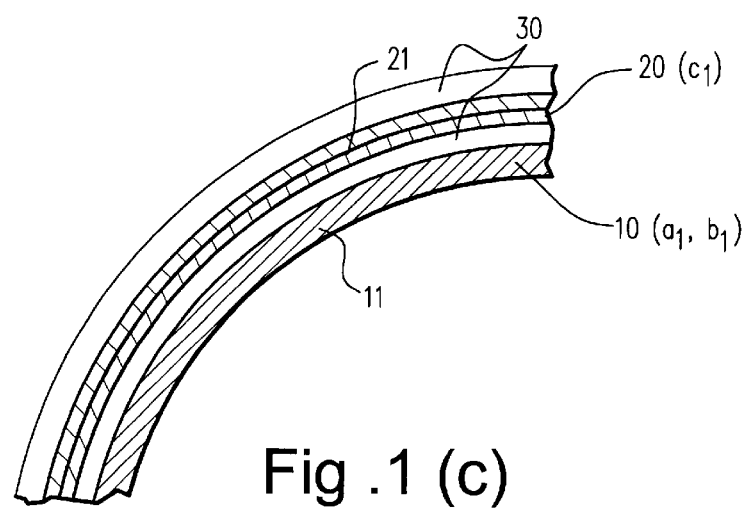
Figure 2:
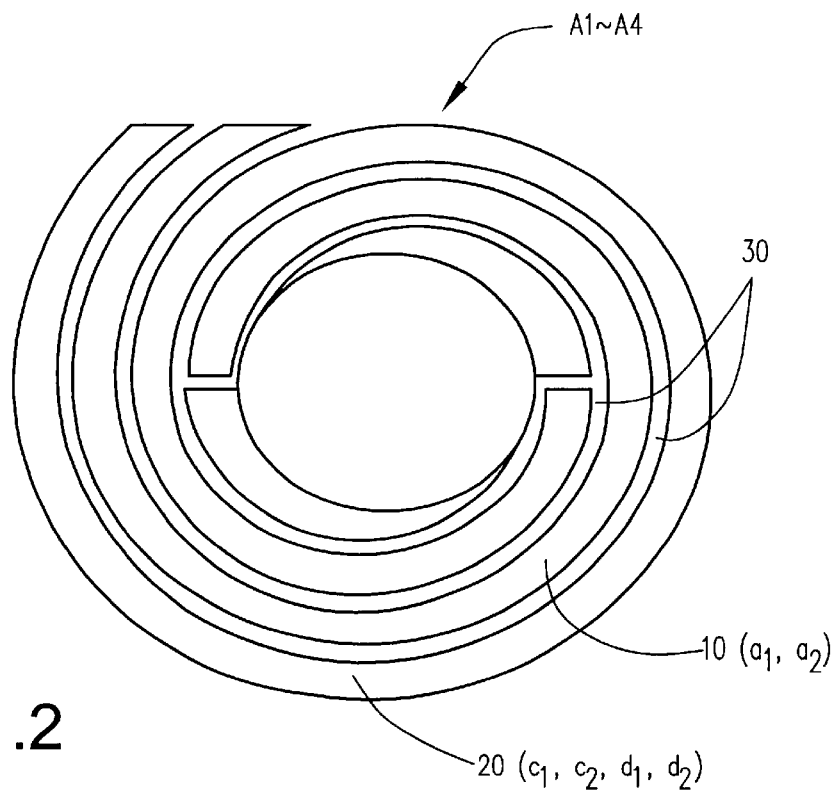
FIG. 2 illustrates a winding core used in the group of spiral electrodes.
Figure 3:
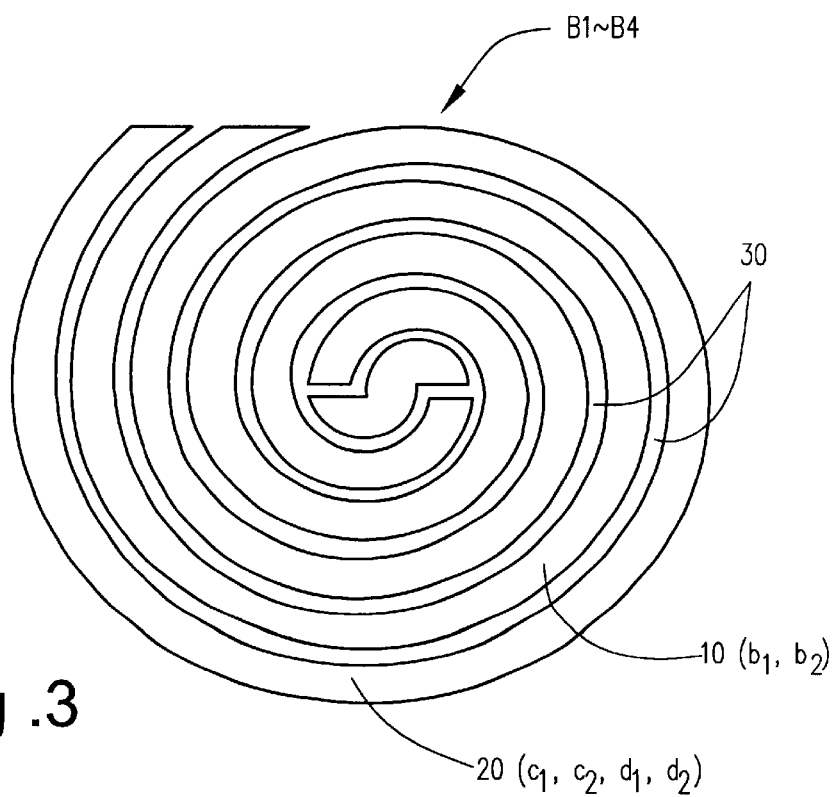
FIG. 3 illustrates a group of spiral electrodes produced without using any winding core.
Figure 4:
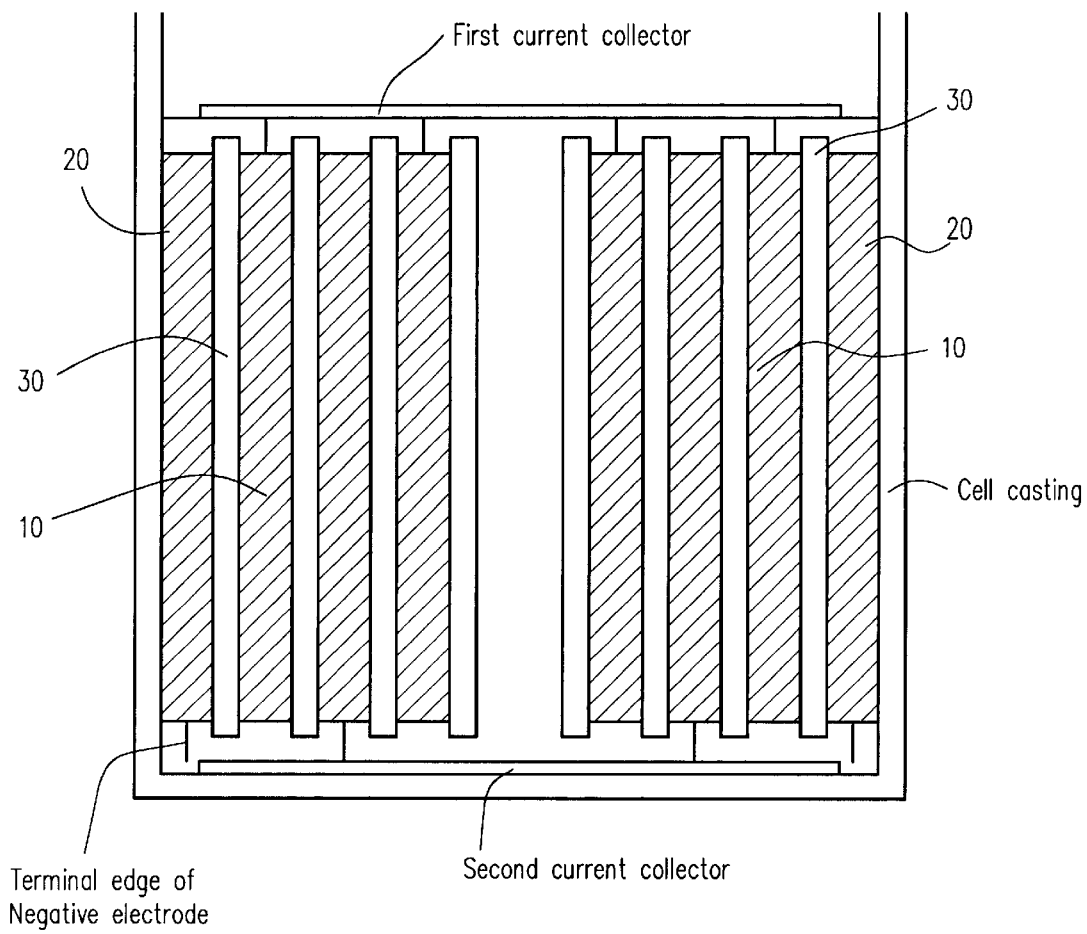
FIG. 4 illustrates the electrodes and current collectors, and their attachment in accordance with the embodiments of the present invention.

Hereinafter, an embodiment of a nickel-hydrogen storage battery provided with a group of spiral electrodes in accordance with the present invention will be described with reference to the drawings. FIGS. 1(a) to 1(c) each illustrate a portion of the outermost periphery of the group of spiral electrodes, FIG. 2 illustrates a winding core used for producing the group of spiral electrodes, and FIG. 3 illustrates a group of spiral electrodes produced without using any winding core. FIG. 4 illustrates the connection of the spiral electrodes to the first and second current collectors and placement of the connected electrodes and current collectors in a cell casing. Although, FIG. 4 shows spiral electrodes wound using a core as in FIG. 2, the connections for spiral electrodes wound without using a winding core, as in FIG. 3 would be the same.

1. Production of Nickel Positive Electrode Plate
(1) Sintered Type Electrode

A mixture of nickel powder and thicker such as calboxymethyl cellulose was added with an amount of water and kneaded to prepare a slurry, and a conductive core plate in the form of a porous nickel plate was coated with the slurry. In tis instance, the slurry was coated on the conductive core plate in such a manner that the central portion of the conductive core plate was remained in a band shape without the slurry to be utilized as a lead portion of current. Thereafter, the conductive core plate coated with the slurry was sintered in a reduction atmosphere to produce a sintered substrate plate of 80% in porosity. The sintered substrate plate was immersed in a solution of nickel nitrate so that the nickel nitrate is impregnated in the pores of the sintered substrate plate. Subsequently, the sintered substrate plate was immersed in an aqueous solution of sodium hydroxide to substitute the nickel nitrate for nickel hydroxide. The impregnation process of nickel nitrate and the substitution process to nickel hydroxide were repeated to make a nickel hydroxide active material from the nickel nitrate thereby to produce a longitudinal sintered nickel positive electrode plate.

The sintered nickel positive electrode plate was cut at its central portion in a longitudinal direction (at the center of the non-coated portion of the conductive core plate) and cut in a predetermined length to produce a sintered nickel positive electrode plate 10. Hereinafter, the positive electrode plate 10 of 210 mm in length is referred to a positive electrode plate a1, and the positive electrode plate 10 of 230 mm in length is referred to a positive electrode plate a2.
(2) Non-sintered type electrode A mixture of 90 parts by weight of nickel hydroxide and 5 parts by weight of metal cobalt powder and 5 parts by weight of cobalt hydroxide powder was kneaded with 20 parts by weight of an aqueous solution containing 1 wt % methyl cellulose to produce a paste of active material. The paste of active material was impregnated into a foamed nickel plate of 600 g/m$^2$ in basis weight and of 1.5 mm in thickness and rolled under pressure after dried until it becomes 0.7 mm in thickness.

Subsequently, an ultrasonic horn was pressed into contact with an upper edge portion of the foamed nickel plate impregnated with the paste of active material so that the active material is removed from the upper edge portion of the foamed nickel plate by ultrasonic vibration applied thereto in a vertical direction. In this instance, the upper edge portion of the foamed nickel plate was pressed by the ultrasonic vibration applied thereto and formed in a thin wall portion. On the other hand, a nickel metal plate of 0.06 mm in thickness formed in a band shape was placed on the upper edge portion of the foamed nickel plate and welded at an interval of 2 mm by using a welding rod to produce a non-sintered nickel positive electrode plate 10. Hereinafter, the non-sintered nickel positive electrode plate 10 cut into 210 mm is referred to a positive electrode plate b1, and the non-sintered nickel positive electrode plate 10 cut into 230 mm is referred to a positive electrode plate b2.

2. Production of Negative Electrode Plate of Hydrogen Absorbing Alloy

Misch metal (Mm: a mixture of rare earth elements), nickel, cobalt, aluminum and manganese were mixed at ratios of 1:3, 4:0.8, 0.2:0.6 and heated in an atmosphere of argon gas in a high frequency induction furnace to prepare an amount of molten alloy. The molten alloy was introduced into a molding die in a usual manner and cooled to produce an ingot of hydrogen absorbing alloy represented by a composition formula $Mm_{1.0}Ni_{3.4}Co_{0.8}Al_{0.2}Mn_{0.6}$.

After coarsely crushed, the ingot of hydrogen absorbing alloy was mechanically pulverized in an atmosphere of inert gas until the average particle diameter becomes about 100 $\mu$m. The powder of hydrogen absorbing alloy was mixed with a binder such as polyethylene oxide and added with an amount of water to prepare a slurry of hydrogen absorbing alloy. The slurry was coated on opposite surfaces of an electrode core plate 21 made of punched sheet metal in such a manner that the density of active material becomes a predetermined value after rolled. Thus, the core plate 21 coated with the slurry was rolled under pressure after dried and cut into a predetermined size to produce a negative electrode plate 20 of hydrogen absorbing alloy.

Hereinafter, the negative electrode plate 20 of hydrogen absorbing alloy provided with the active material at its outermost periphery in a condition where it was spirally wound is referred to a negative electrode plate c, the negative electrode plate c cut into 250 mm is referred to a negative electrode plate c1, and the negative electrode plate c cut into 280 mm is referred to a negative electrode plate c2. The negative electrode plate 20 of hydrogen absorbing alloy the active material of which was removed at one surface of its outermost periphery in a condition where it was spirally wound is referred to a negative electrode plate d, the negative electrode plate d cut into 260 mm is referred to a negative electrode plate d1, and the negative electrode pate d cut into 280 mm is referred to a negative electrode plate d2.

3. Production of Group of Spiral Electrodes
(1) Group of Spiral Electrodes Using a Sintered Type Nickel Positive Electrode Plate a. EXAMPLE 1

The nickel positive electrode plate a1 and negative electrode plate c1 were spirally wound with a separator 30 of unwoven polypropylene fabric interposed therebetween in such a manner that the upper end of positive electrode plate a1 is projected from the upper end of the separator and that the lower end of negative electrode plate c1 is projected from the lower end of the separator. In this instance, as shown in FIGS. 1(a) and 2, a group of spiral electrodes A1 of about 22 mm in diameter was manufactured in a condition where the negative electrode plate c1 is located at the outermost periphery of the group of spiral electrodes and where the negative electrode active material is located at the outside of the electrode core plate.

Thereafter, as shown in FIG. 4, a negative current-collector was welded under resistance to the lower end of negative electrode plate c1, while a positive current-collector was welded under resistance to the upper end of positive electrode plate a1 to produce a cylindrical assembly of the group of spiral electrodes. In this case, the positive current-collector was provided with a disc-like current collecting portion of 18 mm in diameter and a lead portion of current extended from the current collecting portion. The disc-like current collecting portion was formed with a number of openings having protrusions at their bottom portions and formed at its central portion with an introduction hole of electrolyte which was used to allow insertion of a welding electrode in a welding process described later. The negative current-collector was in the form of a disc of nickel metal of 21 mm in diameter. As the diameter of the group of spiral electrodes A1 was about 22 mm while the diameter of the negative current-collector was 21 mm, the outermost periphery of the negative electrode plate was not welded to the negative current-collector at its terminal edge portion.

b. EXAMPLE 2

The sintered nickel positive electrode plate a1 and negative electrode plate d1 of hydrogen absorbing alloy were spirally wound with a separator 30 of unwoven polypropylene fabric interposed therebetween in such a manner that the upper end of positive electrode plate 1a is projected from the upper end of the separator and that the lower end of negative electrode plate d1 is projected from the lower end of the separator 30. In this instance, as shown in FIGS. 1(b) and 2, a group of spiral electrodes A2 of about 22 mm in diameter was manufactured in a condition where the negative electrode plate d1 is located at the outermost periphery of the group of spiral electrodes A2 without the negative active material at the outside of its core plate. Thereafter, as in the Example 1, the negative current-collector was welded under resistance to the lower end of negative electrode plate d1, while the positive current-collector was welded under resistance to the upper end of positive electrode plate a1 to produce a cylindrical assembly of the group of spiral electrodes A2.

c. EXAMPLE 3

The sintered nickel positive electrode plate a2 and negative electrode plate c2 of hydrogen absorbing alloy were spirally wound with the separator 30 of unwoven polypropylene fabric interposed therebetween in such a manner that the upper end of positive electrode plate a2 is projected from the upper end of separator 30 and that the lower end of negative electrode plate c2 is projected from the lower end of separator 30. In this instance, as shown in FIGS. 1(a) and 3, a group of spiral electrodes A3 of about 22 mm in diameter was manufactured in a condition where the negative electrode plate c2 is located at the outermost periphery of the group of spiral electrodes and where the negative electrode active material is located at the outside of the core plate of negative electrode plate c2. Thereafter, as in the Example 1, the negative current-collector was welded under resistance to the lower end of negative electrode plate c2, while the positive current-collector was welded under resistance to the upper end of positive electrode plate 1a to produce a cylindrical assembly of the group of spiral electrodes A3.

d. EXAMPLE 4

The sintered nickel positive electrode plate a2 and negative electrode plate d2 of hydrogen absorbing alloy were spirally wound with the separator 30 of unwoven polypropylene fabric interposed therebetween in such a manner that the upper end of positive electrode plate a2 is projected from the upper end of separator 30 and that the lower end of negative electrode plate d2 is projected from the lower of separator 30. In this instance, as shown in FIGS. 1(b) and 3, a group of spiral electrodes A4 of about 22 mm in diameter was manufactured without using a winding core in a condition where the negative electrode plate d2 is located at the outermost periphery of the group of spiral electrodes without the negative electrode active material at the outside of its core plate. Thereafter, as in the Example 1, the negative current-collector was welded under resistance to the lower end of negative electrode plate d2, while the positive current-collector was welded under resistance to the upper end of positive electrode plate a1 to produce a cylindrical assembly of the group of spiral electrodes A4.

e. COMPARATIVE EXAMPLE 1

The sintered nickel positive electrode plate a1 and negative electrode plate c1 of hydrogen absorbing alloy were spirally wound with the separator 30 of unwoven polypropylene fabric interposed therebetween in such a manner that the upper end of positive electrode plate a1 is projected from the upper end of separator 30 and that the lower end of negative electrode plate c1 is projected from the lower end of separator 30. In this instance, as shown in FIG. 1(c), a group of spiral electrodes A5 of about 22 mm in diameter was manufactured by using the winding core (not shown) in a condition where the separator 30 is located at the outermost periphery of the group of spiral electrodes. Thereafter, as in the Example 1, the negative current-collector was welded under resistance to the lower end of negative electrode plate c1, while the positive current-collector was welded under resistance to the upper end of positive electrode plate a1 to produce a cylindrical assembly of the group of spiral electrodes A5.

f. COMPARATIVE EXAMPLE 2

The sintered nickel positive electrode plate a2 and negative electrode plate c2 of hydrogen absorbing alloy were spirally wound with the separator 30 of unwoven polypropylene fabric interposed therebetween in such a manner that the upper end of positive electrode plate a2 is projected from the upper end of separator 30 and that the lower end of negative electrode plate c2 is projected from the lower end of separator 30. In this instance, as shown in FIGS. 1(a) and 2, a group of spiral electrodes A6 of about 22 mm in diameter was manufactured without using the winding core in a condition where the negative electrode plate c2 is located at the outermost periphery of the group of spiral electrodes. Thereafter, a cylindrical assembly of the group of spiral electrodes A6 was produced in such a manner as in the Example 1.

(2) Group of Spiral Electrodes Using a Non-sintered Nickel Positive Electrode Plate:

a. EXAMPLE 5

The non-sintered nickel positive electrode plate b1 and negative electrode plate c1 of hydrogen absorbing alloy were spirally wound with the separator 30 of unwoven polypropylene fabric interposed therebetween in such a manner that the upper end of positive electrode plate b1 is projected from the upper end of separator 30 and that the lower end of negative electrode plate c1 is projected from the lower end of separator 30. In this instance, as shown in FIGS. 1(a) and 2, a group of spiral electrodes B1 of about 22 mm in diameter was manufactured by using the winding core (not shown) in a condition where the negative electrode active material is located at the outside of the core plate negative electrode plate c1 in the outermost periphery of the group of spiral electrodes. Thereafter, as in the Example 1, the negative current-collector was welded under resistance to the lower end of negative electrode plate c1, while the positive current-collector was welded under resistance to the upper end of positive electrode plate b1 to produce a cylindrical assembly of the group of spiral electrodes B1.

b. EXAMPLE 6

The non-sintered nickel positive electrode plate b1 and negative electrode plate d1 of hydrogen absorbing alloy were spirally wound with the separator 30 of unwoven polypropylene fabric interposed therebetween in such a manner that the upper end of positive electrode plate b1 is projected from the upper end of separator 30 and that the lower end of negative electrode plate d1 is projected from the lower end of separator 30. In this instance, as shown in FIGS. 1(b) and 2, a group of spiral electrodes B2 of about 22 mm in diameter was manufactured by using the winding core (not shown) in a condition where the negative electrode active material does not exist at the outside of the core plate of negative electrode plate d1 in the outermost periphery of the group of spiral electrodes. Thereafter, as in the Example 1, the negative current-collector was welded under resistance to the lower end of negative electrode plate d1, while the positive current-collector was welded under resistance to the upper end of positive electrode plate b1 to produce a cylindrical assembly of the group of spiral electrodes B2, c. EXAMPLE 7

The non-sintered nickel positive electrode plate b2 and negative electrode plate c2 of hydrogen absorbing alloy were spirally wound with the separator 30 of unwoven polypropylene fabric interposed therebetween in such a manner that the upper end of positive electrode plate b2 is projected from the upper end of separator 30 and that the lower end of negative electrode plate c2 is projected from the lower end of separator 30. In this instance, as shown in FIGS. 1(a) and 3, a group of spiral electrodes B3 of about 22 mm in diameter was manufactured without using the winding core in a condition where the negative electrode active plate c2 is located at the outermost periphery of the group of spiral electrodes and where the negative electrode active material exists on the outside of the core plate of negative electrode plate c2 at the outermost periphery of the group of spiral electrodes. Thereafter, as in the Example 1, the negative current-collector was welded under resistance to the lower end of negative electrode plate c2, while the positive current-collector was welded under resistance to the upper end of positive electrode plate b2 to produce a cylindrical assembly of the group of spiral electrodes B3.

d. EXAMPLE 8

The non-sintered nickel positive electrode plate b2 and negative electrode plate d2 of hydrogen absorbing alloy were spirally wound with the separator 30 of unwoven polypropylene fabric interposed therebetween in such a manner that the upper end of positive electrode plate b2 is projected from the upper end of separator 30 and that the lower end of negative electrode plate d2 is projected from the lower end of separator 30. In this instance, as shown in FIGS. 1(b) and 3, a group of spiral electrodes B14 of about 22 mm in diameter was manufactured without using the winding core in a condition where the negative electrode plate d2 is located at the outermost periphery of the group of spiral electrodes and where any negative electrode active material does not exist at the outside of the core plate of negative electrode plate d2 in the outermost periphery of the group of spiral electrodes. Thereafter, as in the Example 1, the negative current-collector was welded under resistance to the lower end of negative electrode plate d2, while the positive current-collector was welded under resistance to the upper end of positive electrode plate b2 to produce a cylindrical assembly of the group of spiral electrodes B4.

e. COMPARATIVE EXAMPLE 3

The non-sintered nickel positive electrode plate b1 and negative electrode plate c1 of hydrogen absorbing alloy were spirally wound with the separator 30 of unwoven polypropylene fabric interposed therebetween in such a manner that the upper end of positive electrode plate b1 is projected from the upper end of separator 30 and that the lower end of negative electrode plate c1 is projected from the lower end of separator 30. In this instance, as shown in FIGS. 1(a) and 2, a group of spiral electrodes B5 of about 22 mm in diameter was manufactured by using the winding core (not shown) in a condition where the separator is located at the outermost periphery of the group of spiral electrodes. Thereafter, as in the Example 1, the negative current-collector was welded under resistance to the lower end of negative electrode plate c1, while the positive current-collector was welded under resistance to the upper end of positive electrode plate b1 to produce a cylindrical assembly of the group of spiral electrodes 135.

f. COMPARATIVE EXAMPLE 4

The non-sintered nickel positive electrode plate b2 and negative electrode plate c2 of hydrogen absorbing alloy were spirally wound with the separator 30 of unwoven polypropylene fabric interposed therebetween in such a manner that the upper end of positive electrode plate b2 is projected from the upper end of separator 30 and that the lower end of negative electrode plate c2 is projected from the lower end of separator 30. In this instance, as shown in FIGS. 1(c) and 2, a group of spiral electrodes B6 of about 22 mm in diameter was manufactured without using the winding core in a condition where the negative electrode plate c2 is located at the outermost periphery of the group of spiral electrodes.

4. Manufacture of Nickel Hydrogen Storage Battery a. EXAMPLES 1, 2, 5, 6 AND COMPARATIVE EXAMPLES 1, 3

Each group of spiral electrodes A1, A2, B1, B2 and A5, B5 of Examples 1, 2, 5, 6 and Comparative Examples 1, 3 was inserted into a bottomed metallic cylindrical cell casing, and the negative current-collector was spot welded to the bottom of the cell casing by means of a set of welding electrodes one of which was inserted into the electrolyte introduction hole of the positive current-collector and engaged with the negative current-collector and the other of which was engaged with the bottom of the cell casing. On the other hand, a closure element composed of a positive electrode cap and a lid body was prepared. The lead portion of the positive current-collector was welded to the bottom of the lid body of the closure element. Thereafter, an amount of electrolyte comprised of an aqueous solution of 30 wt % potassium hydroxide was introduced into the cell casing, and the closure element was coupled within an opening end of the cell casing through a gasket and secured in place by caulking in a liquid-tight manner.

Subsequently, the cell casing was subjected to a contraction process such that the negative electrode plate 20, negative electrode core plate 21 or separator 30 located at the outermost periphery of each group of spiral electrodes is pressed into contact with the internal peripheral wall of the cell casing. Thus, cylindrical nickel hydrogen storage batteries of 2000 mAh in nominal capacity of Examples 1, 2 and Comparative Example 1 and cylindrical nickel hydrogen storage batteries of 3000 mAh in nominal capacity of Examples 5, 6 and Comparative Example 3 were manufactured.

b. EXAMPLES 3, 4, 7, 8

Similarly, each group of spiral electrodes A3, A4, B3, B4 of Examples 3, 4, 7, 8 was inserted into a bottomed metallic cylindrical cell casing, and the negative current-collector was spot welded to the bottom of the cell casing in the same manner described above. On the other hand, a closure cap element composed of a positive electrode cap and a lid body was prepared. The lead portion of the positive current-collector was welded to the bottom of the lid body of the closure element. Thereafter, an amount of electrolyte comprised of an aqueous solution of 30 wt % potassium hydroxide was introduced into the cell casing, and the closure element was coupled within an opening end of the cell casing through a gasket and secured in place by caulk in a liquid-tight manner.

Subsequently, the cell casing was subjected to a contraction process such that the negative electrode plate 20 or negative electrode core plate 21 located at the outermost periphery of each group of spiral electrodes A3, A4, B3, B4 is pressed into contact with the internal peripheral wall of the cell casing. Thus, cylindrical nickel hydrogen storage batteries of 2200 mAh in nominal capacity in Examples 3, 4 and cylindrical nickel hydrogen storage batteries of 3300 mAh in nominal capacity in Examples 7, 8 were manufactured.

c. COMPARATIVE EXAMPLES 2, 4

Each group of spiral electrodes A6, B6 of Comparative Examples 2, 4 was inserted into a bottomed metallic cylindrical cell casing. On the other hand, a closure element composed of a positive electrode cap and a lid body was prepared, and the lead portion of the positive current-collector was welded to the bottom of the cell casing in a condition where a tongue-like current-collecting tab formed at each winding end of the positive electrodes a2, b2 was retained in contact with the bottom of the lid body of the closure element. Thereafter, an amount of electrolyte comprised of an aqueous solution of 30 wt % potassium hydroxide (KOH) was introduced into the cell casing, and the closure element was coupled within an opening end of the cell casing through a gasket and secured in place by caulking in a liquid-tight manner.

Subsequently, the cell casing was subjected to a contraction process such that the negative electrode plate 20 of each group of spiral electrodes A6, B6 is pressed into contact with the internal peripheral wall of the cell casing. Thus, a cylindrical nickel hydrogen storage battery of 2200 mAh in nominal capacity of Comparative Example 2 and a cylindrical nickel hydrogen storage battery of 3300 mAh in nominal capacity of Comparative Example 4 were manufactured.

5. Activation of Nickel Hydrogen Storage Battery

Each nickel hydrogen storage battery of Examples 1 to 8 and Comparative Examples 1 to 4 was charged by a charging current of 0.1 C for sixteen hours and rested for one hour. Thereafter, the storage battery was discharged by a discharging current of 0.2 C until the final discharge voltage becomes 1.0 V and rested for one hour. The charging and discharging were repeated three times to activate each nickel hydrogen storage battery of Examples 1 to 8 and Comparative Examples 1 to 4.

6. Measurement of Discharge Capacity

The activated nickel hydrogen storage batteries each were charged by a charging current of 0.1 C for sixteen hours and rested for one hour. Thereafter, the storage batteries each were discharged by a discharging current of 0.2 C until the final discharge voltage becomes 1.0 V, thereby to calculate a discharge capacity based on the discharging time. A result of the measurement is listed in the following Table 1.

7. Temperature and Internal Pressure of Storage Battery at Charging

The nickel hydrogen storage batteries of Examples 1 to 8 and Comparative Examples 1 to 4 each were charged by a charging current of 1 C to measure the temperature and internal pressure of the respective storage batteries in a condition where the batteries were fully charged. A result of the measurement is listed in the following Table 1.

8. High-Rate Discharge Test

The nickel hydrogen storage batteries of Examples 1 to 8 and Comparative Examples 1 to 4 each were charged by a chairing current of 0.1 C for sixteen hours and rested for one hour. Thereafter, the storage batteries were discharged by a discharging current of 10 A at a higher rate until the final discharge voltage becomes 1.0 V thereby to measure an operation voltage under 50% of discharge capacity of the battery. A result of the measurement is listed in the following Table.

In the Table 1, the term "Current-collector" is used to represent as to whether a negative current-collector was present or not, the term "Welding" is used to represent as to whether the negative current-collector was welded to the bottom of the cell casing or not, the term "Internal pressure" represents an internal pressure of the battery at charging (kgf/cm$^2$), and the term "Temperature" represents an internal temperature (° C.) of the battery at charging.

spiral electrodes A6. Similarly, in comparison of each group of spiral electrodes B1 to B5 with the group of spiral electrode B6, it has been found that the operation voltage of the battery using each group of spiral electrodes B1 to B5 becomes higher than that of the battery using the group of spiral electrodes B6, and it has been also found that the internal pressure and temperature of the battery using each group of spiral electrodes B1 to B5 become lower than those of the battery using the group of spiral electrodes B6. In this respect it is seemed that the result was obtained by the facts that the negative current-collector welded to each group of spiral electrodes A1 to A5 and B1 to B5 was effective to decrease the voltage drop of the battery and to lower joule heat of the battery and that the drop of the battery temperature and uniformity of reaction were effective to decrease the internal pressure of the battery.

In comparison of each group of spiral electrodes A1, A2 with the group of spiral electrodes A5, it has been found that the operation voltage of the battery using each group of spiral electrodes A1, A2 becomes higher than that of the battery using the group of spiral electrodes A5, and it has been also found that the internal pressure and temperature of the battery using each group of spiral electrodes A1, A2 become lower than those of the battery using the group of

TABLE 1

| Group of spiral electrodes | Substance at the outermost periphery of group of spiral electrodes | Current-collector | Welding | Discharge capacity (mAh) | Operation voltage | Internal pressure (kgf/cm$^2$) | Temp. (° C.) |
|---|---|---|---|---|---|---|---|
| A1 | Active material | Yes | Yes | 2000 | 1.200 | 8 | 32 |
| A2 | Core plate | Yes | Yes | 2000 | 1.220 | 6 | 30 |
| A3 | Active material | Yes | No | 2200 | 0.910 | 12 | 36 |
| A4 | Core plate | Yes | No | 2200 | 1.180 | 10 | 34 |
| A5 | Separator | Yes | Yes | 2000 | 1.180 | 10 | 34 |
| A6 | Active material | No | — | 2200 | 0.890 | 14 | 38 |
| B1 | Active material | Yes | Yes | 3000 | 1.190 | 9 | 33 |
| B2 | Core plate | Yes | Yes | 3000 | 1.210 | 7 | 31 |
| B3 | Active material | Yes | No | 3300 | 0.900 | 13 | 37 |
| B4 | Core plate | Yes | No | 3300 | 1.170 | 11 | 35 |
| B5 | Separator | Yes | Yes | 3000 | 1.170 | 11 | 35 |
| B6 | Active material | No | — | 3300 | 0.880 | 15 | 39 |

As is understood from the Table 1, it has been found that the discharge capacity of each group of spiral electrodes A1 to A6 using the sintered nickel positive electrode plate is smaller than that of each group of spiral electrodes B1 to B6 using the non-sintered nickel positive electrode plate. It is seemed that the result was obtained by the fact that the amount of active material impregnated into the non-sintered nickel electrode plate increased more than that in the sintered nickel electrode plate.

In comparison of each group of spiral electrodes A1 to A5 with the group of spiral electrodes A6, it has been found that the operation voltage of the battery using each group of spiral electrodes A1 to A5 becomes higher than that of the battery using the group of spiral electrode A6, and it has been also found that the internal pressure and temperature of the battery using each group of spiral electrodes A1 to A5 become lower than those of the battery using the group of spiral electrodes A5. Similarly, in comparison of each group of spiral electrodes B1, B2 with the group of spiral electrodes B5, it has been found that the operation voltage of the battery using each group of spiral electrodes B1, B2 becomes higher than that of the battery using the group of spiral electrode B5, and it has been also found that the internal pressure and temperature of the battery using each group of spiral electrodes B1, B2 becomes lower than those of the battery using the group of spiral electrodes B5. In each group of spiral electrodes A1, A2 and B1, B2, the negative current-collector was welded to the bottom of the cell casing. In contrast with this, each group of spiral electrodes A5, B5 was covered with the separator 30 at its outermost periphery. It is, therefore, seemed that the voltage drop of the battery using each group of spiral electrodes A5, B5 was caused due to the separator 30 to decrease the operation voltage of the battery. It is also seemed that the separator in the battery using each group of spiral electrodes A5, B6 causes an increase of joule heat and a rise of temperature of the battery at charging. Furthermore, it is seemed that the rise of temperature and irregularity of reaction causes an increase of the internal pressure of the battery.

In comparison of the group of spiral electrodes A1 with the group of spiral electrodes A3 and of the group of spiral electrodes A2 with the group of spiral electrodes A4, it has been found that the discharge capacity of the battery using each group of spiral electrodes A3, A4 becomes larger than that of the battery using each group of spiral electrodes A1, A2 but the operation voltage of the former battery becomes lower than that of the latter battery. Similarly, in comparison of the group of spiral electrodes B1 with the group of spiral electrodes B3 and of the group of spiral electrodes B2 with the group of spiral electrodes B4, it has been found that the discharge capacity of the battery using each group of spiral electrodes B3, B4 becomes larger than that of the battery using each group of spiral electrodes B1, B2 but the operation voltage of the former battery becomes lower than that of the latter battery. In this respect, it is seemed that the result was obtained by the facts that as each group of spiral electrodes A3, A4, B3, B4 was manufactured without using a winding core and that the positive and negative electrode plates were prolonged to cause an increase of the discharge capacity. However, in each group of spiral electrodes A3, A4, B3, B4, the negative current-collector could not be welded to the bottom of the cell casing. This results in an increase of the voltage drop, a decrease of the operation voltage and an increase of joule heat of the battery and a rise of temperature of the battery. It is, therefore, seemed that the internal pressure of the battery was increased due to the rise of the temperature and irregularity of reaction.

In comparison of the group of spiral electrodes A1 with the group of spiral electrodes A2 and of the group of spiral electrodes A3 with the group of spiral electrodes A4, it has been found that the operation voltage of the battery using each group of spiral electrodes A2, A4 becomes higher than that of the battery using each group of spiral electrodes A1, A3, and it has been also found that the internal pressure and temperature of the battery using each group of spiral electrodes A2, A4 becomes lower than those of the battery using each group of spiral electrodes A1, A3. Similarly, in comparison of the group of spiral electrodes B1 with the group of spiral electrodes B2 and of the group of spiral electrodes B3 with the group of spiral electrodes B4, it has been found that the operation voltage of the battery using each group of spiral electrodes B2, B4 becomes higher than that of the battery using each group of spiral electrodes B1, B3, and it has been also found that the internal pressure and temperature of the battery using each group of spiral electrodes B2, B4 becomes lower than those of the battery using each group of spiral electrodes B1, B3. As in each group of spiral electrodes A2, A4 and B2, B4, the electrode core plate was placed at the outermost periphery thereof, the electrode core plate causes a decrease of the voltage drop and an increase of the operation voltage of the battery. It is, therefore, seemed that the electrode core plate is useful to decrease joule heat of the battery and lower the temperature of the battery at charging. In addition, the internal pressure of the battery is decreased by drop of the temperature and uniformity of reaction.

9. Variation of Entropy of Storage Battery

To investigate variation of entropy of the storage battery, the nickel hydrogen storage battery and a nickel cadmium storage battery of the same size as the battery in a charged condition of 50% were retained under constant pressure (pkgf/cm$^2$) for three hours at −20° C., −10° C. and 0° C. in sequence. Thereafter, each open-circuit voltage of the storage batteries was measured to calculate variation of entropy (ΔS) the batteries at discharging on a basis of the following equation (1). A result of the measurement is shown in the following Table 2.

$$\Delta S = zF(\partial E/\partial T)p \text{ (J/mol K)} \tag{1}$$

where the character z is defined as z=1, and the character F is defined F=96500. Thus, a generation amount of heat (TΔS) can be calculated on a basis of the variation of entropy (ΔS).

TABLE 2

| Type of Storage Battery | Variation of Entropy (ΔS) |
|---|---|
| Nickel-hydrogen storage battery | 10 (J/mol K) |
| Nickel-cadmium storage battery | −20 (J/mol K) |

In the Table 2, the sign "−" (negative) represents reaction of heat generation at discharging. In addition, variation of entropy at charging can be calculated by reverse of variation of entropy at discharging.

As is understood from the Table 2, the nickel-cadmium storage battery causes heat absorbing reaction at charging, while the nickel-hydrogen storage battery causes heat generating reaction. Accordingly, the temperature of the nickel-hydrogen storage battery is risen due to an increase of the generation amount of heat caused by the heat generating reaction at charging. For this reason, the present invention is useful to suppress a rise of the temperature of the battery In the preferred embodiments of the present invention described above, it is to be noted that the negative electrode plate 20 located at the outermost periphery of the group of spiral electrodes is pressed into contact with an internal peripheral wall of the cell casing to uniform current-collection and to decrease the voltage drop of the battery for enhancement of the high-rate discharge characteristic of this kind of alkaline storage battery. In the case that the group of spiral electrodes is formed without any space at its central portion for providing an alkaline storage battery of higher capacity, it is desirable that the negative electrode plate located at the outermost periphery of the group of spiral electrodes is pressed into contact with an internal peripheral wall of the cell casing to decrease resistance at a portion in contact therewith thereby to decrease the voltage drop of die battery.

In addition, in the case that the core plate 21 of the negative electrode plate is pressed into contact with the internal peripheral wall of the cell casing, the resistance at the portion in contact with the cell casing is further decreased to suppress the voltage drop of the battery for enhancement of the high-rate discharge characteristic of this kind of alkaline battery.

In the preferred embodiments, the metallic cell casing was used as a negative terminal, the closure cap element was used as a positive terminal, and the negative current-collector welded to the negative electrode plate of the group of spiral electrodes was welded to or retained in contact with the bottom of the cell casing. However, in the case that the metallic cell casing is used as a negative terminal, the positive current-collector welded to the positive electrode plate of the group of spiral electrodes may be welded to or retained in contact with the bottom of the cell casing.

What is claimed is:

1. An alkaline storage battery including a group of spiral electrodes composed of positive and negative electrode plates spirally wound with a separator interposed therebetween and contained in a metallic cell casing used as an external terminal, said group of spiral electrodes being formed at its central portion with a space defined by a winding core during the winding process of the electrode plates and having a first current-collector welded to an upper end of one of the electrode plates and a second current-collector welded to a lower end of the other electrode plate, wherein said second current-collector is welded to an internal bottom surface of said cell casing and is free from a terminal edge portion of the other electrode plate located at the outermost periphery of said group of spiral electrodes, and wherein a core plate of the other electrode plate placed at the outermost periphery of said group of spiral electrodes is pressed into direct contact with an internal peripheral wall of said cell casing without any active material at its outside to cause uniform current-collection at a portion in contact therewith.

2. An alkaline storage battery including a group of spiral electrodes composed of positive and negative electrode plates spirally wound with a separator interposed therebetween and contained in a metallic cell casing used as an external terminal, said group of spiral electrodes being formed without any space at its central portion and having a first current-collector welded to an upper end of one of the electrode plates and a second current-collector welded to a lower end of the other electrode plate, wherein said second current-collector is retained in contact with an internal bottom surface of said cell casing and is free from a terminal edge portion of the other electrode plate located at the outermost periphery of said group of spiral electrodes and wherein a core plate of the other electrode plate placed at the outermost periphery of said group of spiral electrodes is pressed into direct contact with an internal peripheral wall of said cell casing without any active material at its outside to decrease resistance at a portion in contact therewith.

3. An alkaline storage battery as claimed in claim 1 or 2, wherein said group of spiral electrodes is adapted for use in a nickel hydrogen storage battery.

* * * * *